[19] United States Patent
Botnick et al.

[11] 3,777,840
[45] Dec. 11, 1973

[54] DOOR MOUNTED SEAT BELT LOCKING RETRACTOR

[75] Inventors: Irlin H. Botnick, 3155 Kersdale Rd., Pepper Pike, Ohio 44124; Lewis H. Polster, Shaker Heights, Ohio

[73] Assignee: said Botnick, by said Polster

[22] Filed: Apr. 23, 1971

[21] Appl. No.: 136,955

[52] U.S. Cl............ 180/82 C, 180/111, 242/86.8, 242/106, 242/107 SB, 280/150 SB, 297/388
[51] Int. Cl........................................... B60r 21/10
[58] Field of Search............... 280/150 SB; 297/384, 297/387, 385, 388; 242/54, 47, 86.8, 106, 107; 180/82, 82.8, 103, 111

[56] References Cited
UNITED STATES PATENTS

| | | | |
|---|---|---|---|
| 3,506,083 | 4/1970 | Botnick et al. | 280/150 SB X |
| 2,858,144 | 10/1958 | Oppenheim | 280/150 SB |
| 2,937,882 | 5/1960 | Oppenheim | 280/150 SB |
| 3,583,726 | 6/1971 | Lindblad | 280/150 SB |

*Primary Examiner*—Kenneth H. Betts
*Assistant Examiner*—John P. Silverstrim
*Attorney*—Ely, Golrick & Flynn

[57] ABSTRACT

In a door mounted seat belt retracting and locking unit, one belt end is secured to an anchor plug lockable in a translatable, cable-guiding anchor bracket by a vacuum bellows actuated latch; a flexible cable from the inner plug end being wound on a spring return-biased reel, having sprocketed flanges engaged in a rack in a unit base or frame attached to the vehicle door. Upon a permitted door opening, with plug withdrawal and cable unreeling, the reel with connected anchor bracket walks forwardly along the door carrying the belt away from the seat and winding the spring of the reel, which upon door closure automatically retracts the cable, the reel and anchor bracket walking back into position for locking by the latch control system upon the motor starting. The bracket slot at all times is covered by a roller-guided flexible band running from one side of the bracket around the unit frame back to the other bracket side. Variants are disclosed.

As the installation of seat belts in automotive vehicles, particularly passenger autos, is now quite widespread, the personal safety advantages of seat belt equipment, the environment of use, and the ordinary use thereof require here no particular discussion. However, safety studies evaluating the now considerable experience with belts have shown that there is extensive non-use of installed belts in consequence of carelessness, laziness, inadvertance or forgetfulness of drivers or passengers in attending to the simple operation of picking up and buckling the seat belt ends immediately upon entering the vehicle.

28 Claims, 8 Drawing Figures

INVENTORS
IRLIN H. BOTNICK,
BY LEWIS H. POLSTER

Ely, Golrich & Flynn
ATTORNEYS

INVENTORS
IRLIN H. BOTNICK &
LEWIS H. POLSTER
BY
ATTYS.

DOOR MOUNTED SEAT BELT LOCKING RETRACTOR

The present invention provides a seat belt arrangement in which, with one end of the seat belt if desired permanently conventionally attached to the car frame at the inner side of a seat position, the other end is permanently or semi-permanently attached to the adjacent door in such manner that the belt may be left at all times in position ready for use. To this end a door mounted belt anchoring, shifting and retracting device is disclosed whereby the belt is swung forward away from the seat as the door is opened thereby allowing the user to enter or leave the seat in convenient fashion; is brought back into user restraining position upon door closure, and is normally automatically locked or anchored in operative position upon initiating motor operation for use of the vehicle. The disclosed unit conveniently may be installed at the position of and serve as an arm rest on a door.

It is the general object of the present invention to provide a door-mounted auto safety seat belt locking and retractor unit which presents the belt in operable position at all times when driver or passenger enters a seat, while permitting him conveniently to enter and leave the seat.

Another object of the present invention is the provision of a door-mounted seat belt anchoring and retracting unit providing automatic belt latching at appropriate times.

Other objects and advantages will appear from the following description and the drawings wherein.

Figure 1:
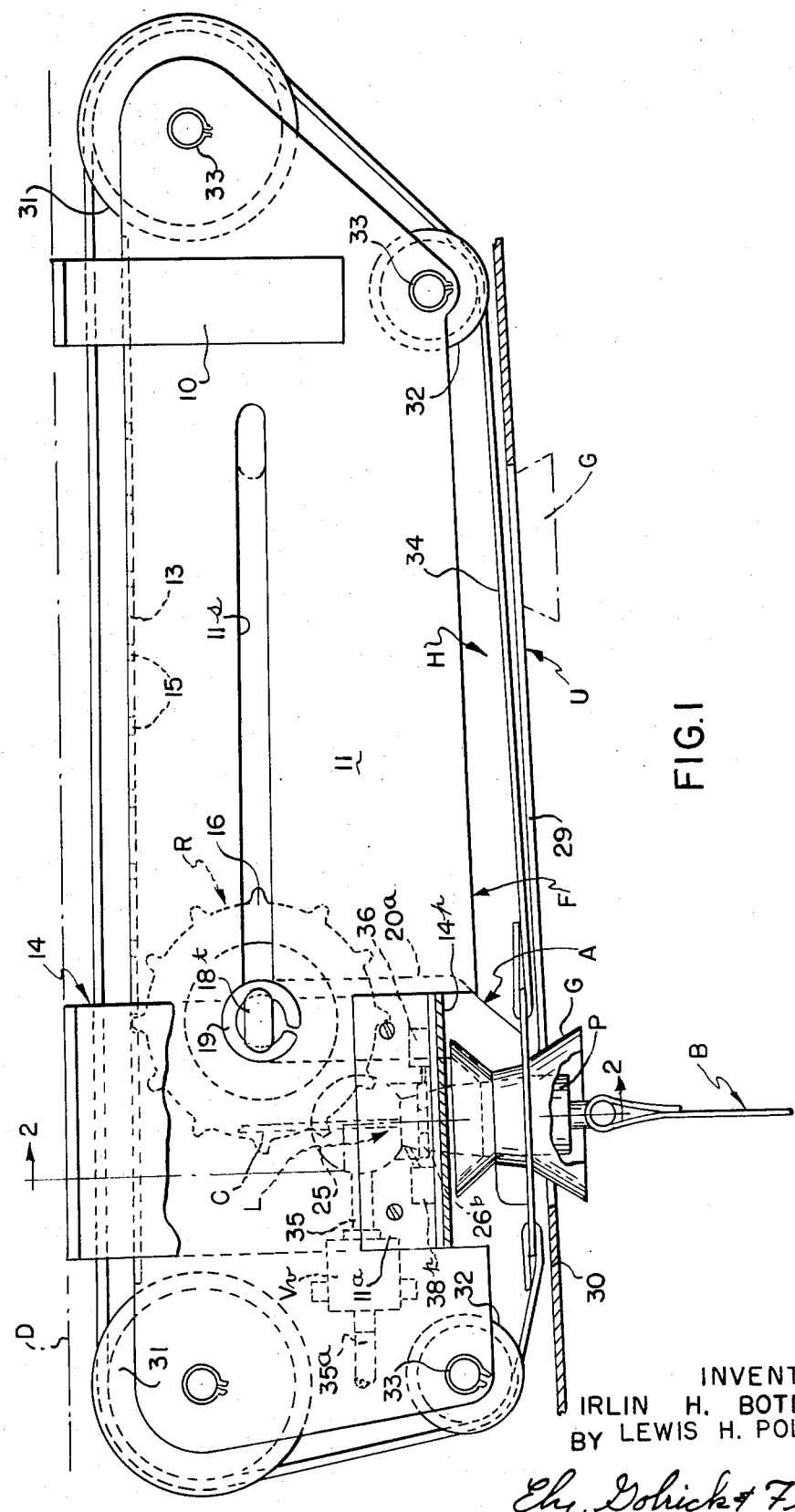
FIG. 1 shows in a top plan view one form of a motor vehicle seat belt retractor and locking unit embodying the present invention.

In FIG. 1, representing one embodiment of the invention, ther is seen the general organization of seat belt shifting, retracting and locking unit U for the "free" end of a motor vehicle seat belt B, represented in fragmentary form, but reaching across a passenger or driver seat position in the vehicle from a point at the other side of the seat position where the other end is conventionally anchored to the vehicle chassis. The unit U (see FIG. 1) comprises a generally horizontally extending frame F anchored on the inside of a vehicle door adjacent a belt-equipped seat position, the inside wall or panel of which door is indicated by the dashed line D; a walking reel mechanism R for a flexible cable C with a belt anchoring plug P on its free end; a traveling anchor bracket A, projecting through and translatable in a longitudinal frame slot and including a hollow hour-glass shaped cable guide and receptor G for the plug P; and a belt latching mechanism L for which suitable operational control is connected with the engine or vehicular drive equipment. The reel mechanism R with bracket A are guided in longitudinal fore and aft movement in the frame; and a device H shiftable with the anchor bracket A masks the longitudinal frame slot.

Figure 2:
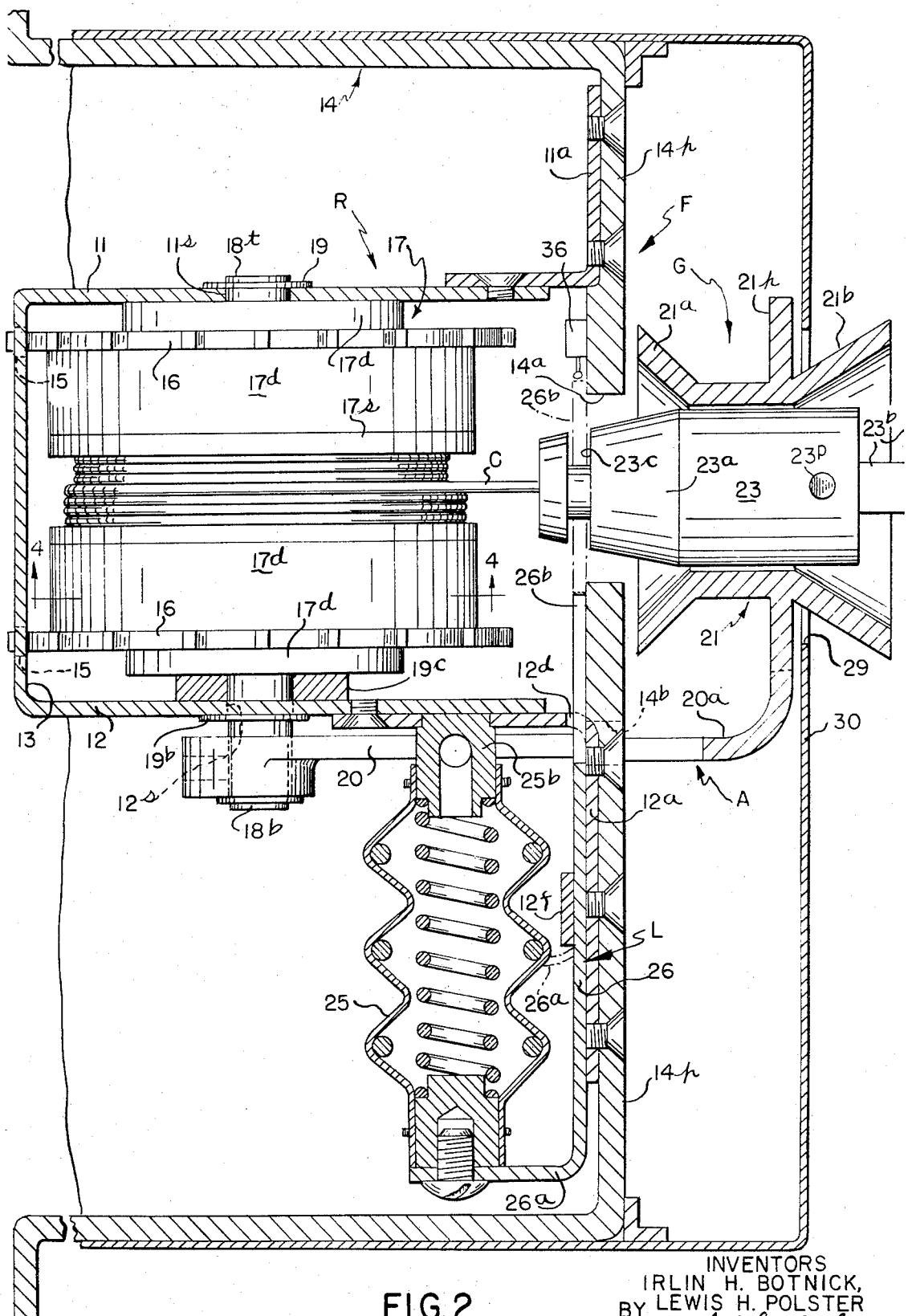
FIG. 2 is an enlarged sectional view showing a reeling and anchoring mechanism, taken as indicated by the line 2—2 in FIG. 1.

The basic structure of frame F (see FIGS. 1 and 2) is provided by a heavy sheet metal stamping formed into a channel opening toward the seat (bottom of FIG. 1, right side in FIG. 2) to provide horizontal generally similar top and bottom wall plates 11, 12, of the plan shape seen in FIG. 1, integrally joined along the major length of their inner edges by a straight vertical web 13 serving as a rack plate (at top of FIG. 1; left of FIG. 2); and a housing including top and bottom brackets as at 10 and a strong base 14 all rigidly secured to the door; the base 14 including a vertically disposed plate 14p longitudinally slotted at 14a and 14b for the cable and bracket arm 20. Longitudinal angle elements 12a, 12a provide coplanar vertical flanges whereby the channel mouth is secured to plate 14.

Figure 3:
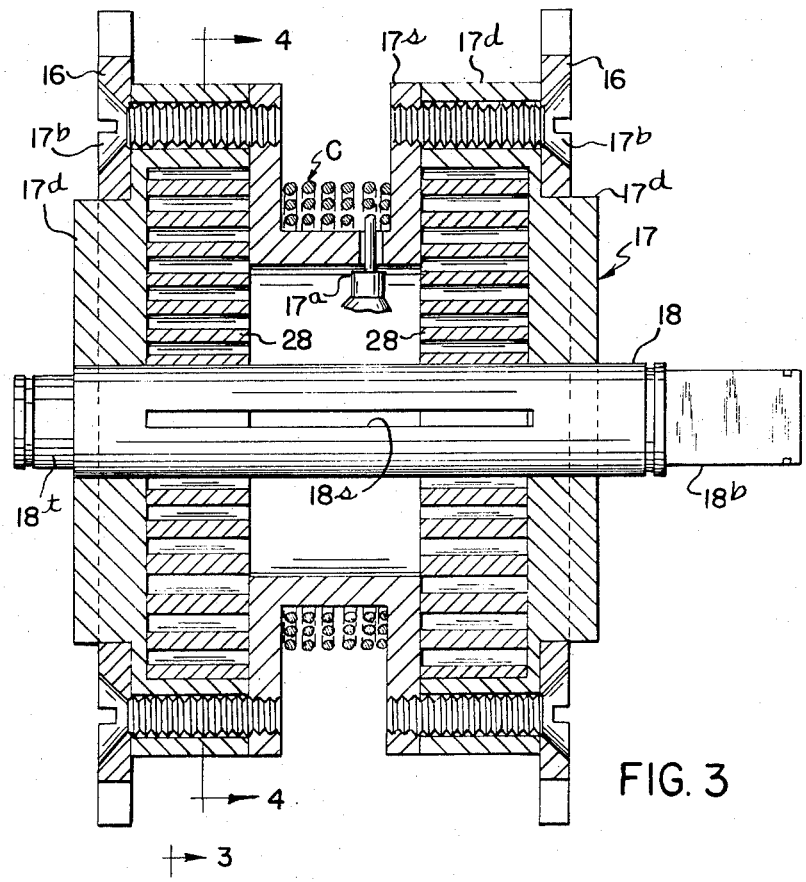
FIG. 3 is a detail of the reel mechanism in axial section.

Parallel top and bottom series of square perforations 15, 15 in the web 13 in one-to-one vertical correspondence and appropriately spaced corresponding to toothing in the top and bottom sprocket end discs 16, 16 of the reel mechanism R provide a horizontal reel rack, in effect a rack and pinion engagement of the reel 17 rotatable on the non-rotatable, translatable shaft 18, having the top and bottom end portions 18t, 18b slideably engaged in and projecting through respective top and bottom plate slots 11s–12s extending longitudinally parallel to each other and to the rack plate 13. The upper shaft end 18t (see FIGS. 1, 2 and 3) is an enlargement having diametric flats for a non-rotational as well as the slideable engagement in slot 11s and is retained by a contractile split C-ring 19 above the top plate. The shaft bottom end 18b is flatted or squared below the bottom plate for pin or set screw securement thereto of the anchor bracket horizontal arm 20 projecting outwardly through the base plate slot 14b and, on its laterally offset upwardly turned outer end 20a, carrying the integral plate 21p with hollow hour-glass shaped cable guiding and receptor formation G for the bullet-shaped plug P on the end of cable C. The lower shaft end may similarly be provided with a retaining split ring 19b; and a thrust bearing plate or spacer 19c may be interposed on 18b, between plate 12 and the reel bottom disc 17d. The arm 20 likewise can be secured on a squared shaft portion at the location of wear or bearing plate 19c.

In the receptor G, the inner and outer flaring or bell mouths 21a, 21b serve as guide means feeding the cable onto the reel and keeping it clear of sharp localized cable abrading edges; the outer bell also cooperatively engaging the tapered plug end 23a to guide the cylindrical plug body 23 into a predetermined position in the closely embracing cylindrical receptor middle portion 21. Stop means, such as a pin 23p or an enlargement on the outer end of plug body 23 engaging the convergent surface in 21b, limit the entrance into the receptor for latching alignment purposes. The end B of the main belt portion is secured to the plug (hence to cable C as the wound terminating belt portion of the overall belt arrangement) by a Tee 23b with shank passing through a belting web end loop perforation and threaded into the plug outer end. The outer bell 21b projects through a slot 29 in a vertical face of a cover 30 secured to the unit and usefully shaped to serve as an arm rest when provided with decorative covering and padding. Slot 29 extends generally parallel to the frame channel mouth as a larger slot, and has a localized enlargement for insertion of bell 21b.

In the latching mechanism L (best seen in FIG. 2), as a latch actuator, a vertically acting, simple spring-expanded, vacuum-contracted bellows 25 is end-secured between the horizontal flange of 12a on plate 12 and a right angle extension 26a of the vertical latch plate 26. The latter, guided in angle slot 12d and plate guide 12f, is slideably mounted on the inside of plate 14p at a position where its end-slotted or bifurcated top end 26b is slideable upwardly across the plate slot 14a to engage in the circumferential groove 23c of the tapered inner plug end 23a; slot 14a being a narrowed continuation of the wide channel mouth slot. On the inside of plate 14b, a microswitch 36 is supported with its associated actuating lever arm so disposed in the path of latch extension 26a that the switch closes when the plug is locked; and on the underside of plate 12 there is mounted an air valve Vv (such as that shown in FIG. 5) connected by tube 35 to the top or vacuum inlet end of bellows 25 for purposes to be detailed.

Thus the actuated latch, by engaging the positioned plug P (at a time only when the anchor bracket A is in its retracted position as indicated by the solid line representation of its cable guide portion G), anchors the belt end B and cable C to plate 14p against withdrawal; and, since the cable cannot unreel, also the anchor bracket A and reel mechanism R are in effect anchored against translation.

Figure 4:
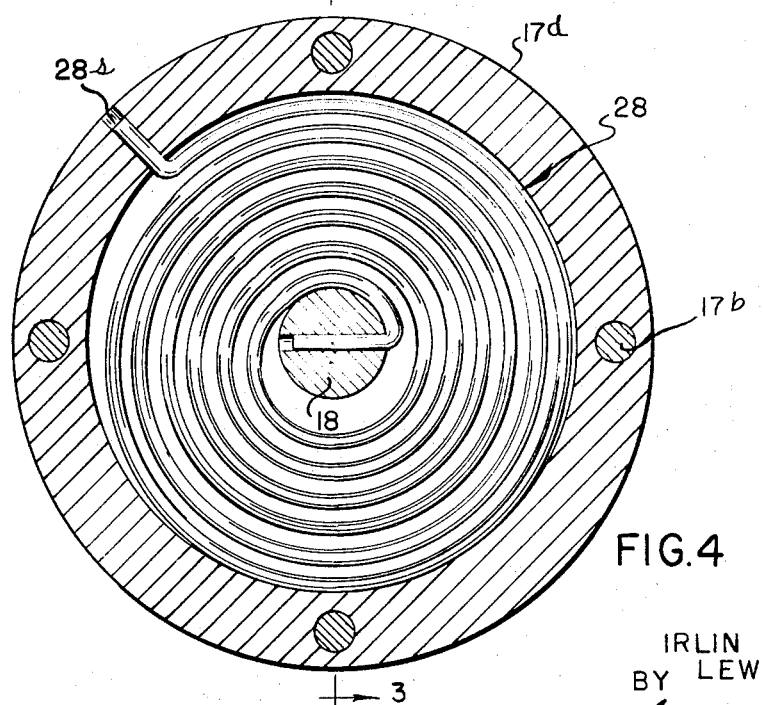
FIG. 4 is a radial section through the reel taken as indicated by the line 4—4 in FIG. 2 or FIG. 3.

In the cable reel mechanism R (see FIGS. 3 and 4), the reel 17, hollow to house two spiral constant force motor spring elements 28, is comprised of two like, externally shouldered discs 17d, 17d rotatable on shaft 18 and secured with sprocket discs 16 by flat head bolts 17b to the flanges of a centrally hollow cable spool element 17s sandwiched therebetween. The inner faces of discs 17d are cylindrically recessed to diameters larger than the inner diameter of spool 17s forming a spring barrel structure to receive the corresponding spiral springs 28, each having its inner end engaged in a longitudinal shaft slot 18s and an outer end at 28s anchored in a recess wall slot. On spool 17s, square channel shaped in annular cross-section to provide cylindrical spool bottom in which the inner cable end is anchored at 17a, the cable is wound counterclockwise, as viewed in FIG. 1, so that cable withdrawal, hence counterclockwise reel rotation, causes the reel to walk forward (to right in FIG. 1) toward the vehicle door hinge.

In the device H, a broad tape or band 34 having opposite ends attached through parallel end slots in plate element 21p is passed over front and back pairs of flanged guide rolls 31—31 32—32, mounted between plates 11, 12 on respective vertical shafts disposed near the "corners" of the frame and retained by contractile C-rings or snap rings 33 on opposite shaft ends. The band thus is in effect an endless hand immediately behind slot 29 and shiftable with the anchor bracket as the latter is translated longitudinally of the frame, thereby internally covering slot 29, and masking the frame slots and other underlying structure.

In the aforegoing, for convenience of description, a horizontal disposition has been assumed for the unit U, i.e., with rack plate 13, plates 11–12 and slot 29 extending horizontally. However, it is to be understood that an upwardly or downwardly sloped disposition may also be used as may be needful or most advantageous in a given vehicle seat environment.

Accordingly in this arrangement when the plug P is latched in the retracted anchor bracket, the belt end is anchored at a fixed point on the door, the belt is in appropriate motorist restraining disposition, and the door is held by the belt against opening. When the plug is unlatched, by the bellows spring biased retraction of the latch plate to the position shown in solid lines in FIG. 2, the plug may be withdrawn and the cable unreeled, and hence the door may be opened. Opening of the door swings the entire unit outwardly and forwardly on an arcuate path about the door hinge axis (well out to the right of FIG. 1). In addition to the forward advance of the belt and cable, as it were pivoting about the fixed point of inner belt end achoring due to the geometry of the door swing, a further forward swing of the belt-cable line results, since the cable unreeling rotation of the reel 17 walks the latter forward (to the right in FIG. 1) along the rack plate 13 toward the hinged door edge, thus translating the entire reel mechanism and anchor assembly. Obviously, the increased cable-belt line displacement from the seat position advantageously allows the passenger to enter or leave the vehicle even more conveniently.

The effective spool diameter and width in 17s is chosen relative to the cable diameter and layering and to the sprocket advance per reel revolution so that the cable pays out sufficiently to allow normal full door opening, and is reeled up in a manner keeping the belt-cable reach reasonably taut.

The reel shaft 18 being held against rotation by the slot engagement, accordingly the springs are wound up later to serve as cable and belt retracting motor means. Upon door closure, the spring force and the decreasing cable tension causes cable in-reeling rotation, and therewith back tracking of the reel mechanism M and anchor bracket A, torwards the latchable position (shown in full in FIG. 1 and FIG. 2) ready for plug locking.

Thus upon operation of the latch 26 onto its bolted position, the "free" or door end of the belt is anchored appropriately as required for seat belt restraint of the user; and further the door is retained from opening as is obviously advantageous in the event of an accident or collision tending to throw open the door.

The belt will be provided with a length adjusting device (not shown as several types are well known), such as an inner end anchoring device securable at various points on the corresponding belt end, or a take-up buckle not requiring severance of the belt into two portions, when the unit serves only a single-occupant seat space; or least desirably, except when the belt B is actually a single belt serving the entire seat space between two opposed doors (when each door unit is considered as an end anchor for the single belt's respective end relative to the other end as a "free" end locked by the other unit), a buckle connecting separate belt portions. Ceiling anchored shoulder straps may be attached to the belts, preferably disconnectably; and so also jumper straps between adjacent belt portions, for defining a middle seat space.

For the above described unit, before driving proceeds, an appropriate control system will lock up the plug, by electrical means such as a solenoidal latch actuator tied to the ignition system to latch when the ignition key is turned on, or other means responsive to a vehicle driving condition, and preferably such as keeps the unit latched for at least a short time after the engine stops rotating.

Figure 6:
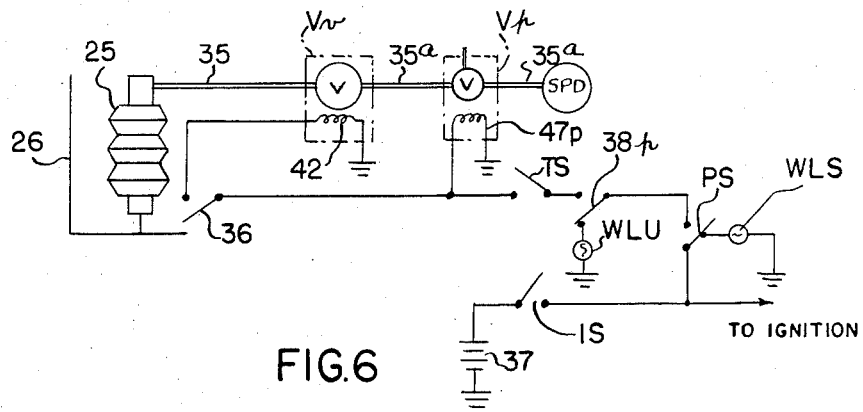
FIG. 6 is a schematic diagram presenting one form of control system for the unit.

The control system of schematic FIG. 6 is suitable for a unit using, rather than a solenoid, the described vacuum bellows actuator at 25 connected through fluid conduit 35, valve Vv and conduit 35a (preferably with a further valve Vp in line 35a) to a fluid pressure differential source SPD operating when the engine is running; here to the engine intake manifold, which by air pump action of the running engine is under vacuum.

The valve Vv (for which is suitable the valve V hereinafter described relative to FIG. 5) is spring biased normally open, to apply actuating vacuum, and solenoidally closed for maintaining the vacuum (the system being not disabled) in the bellows as long as the solenoid is energized through a control system interconnection with the vehicle ignition system for energization from vehicle battery 37 comprising (as a series connected control branch running to ground from a point of the controlled side of ignition switch IS), at least a normally open microswitch 36 as a vacuum lock switch, and the valve solenoid 42 of valve Vv.

However, to disable or release the system, the further solenoidally operated valve Vp, shown as a three-way valve, is inserted in line 35a and its solenoid 47p is connected in parallel with 42 and 36. Valve Vp connects Vv to atmosphere when its solenoid is de-energized ("normally vented") and, upon energization, connects Vv through 35a to the intake manifold. Here the electrical control branch further includes a system disabling switch PS, and preferably also the normally open contacts of microswitch 38p closed by retracted anchor bracket A or better by plug P when in latchable position, and a transmission switch TS.

As a manual system disabling switch, switch PS is conveniently dashboard mounted, and is preferably a two-position switch, which in "system off" position switches on a warning device WLS, such as a light or preferably a buzzer or both. The valve Vv conveniently is mounted in the retractor unit as indicated in FIG. 1 proximate to bellows 25, keeping vacuum line or conduit 35 short, and preferably so also Vp.

The microswitch 36 is positioned near latch plate 26 where its lever arm will be tripped to closed position by the latch reaching locked position. Normally open microswitch 38p is also mounted in the unit in the retracted position region of the anchor bracket A, where it will be closed by some element carried by or moving with bracket A when G is in position for latching, most preferably by the plug P itself when latchable. Preferably it also has a normally closed contact connected to a second buzzer or light warning device WLU. The transmission switch TS is closed when the transmission is set in a forward or reverse position, but opened when the transmission drive selector lever is set at "Park" or "Neutral."

The vacuum air line 35a and similarly the electrical line portions running from the unit on the door past the door hinge region to the main chassis include flexible, or extensibly-retractably supported portions or other appropriate intervening means to accommodate the door swing action.

With this arrangement, when the ignition is merely turned on, assuming main system switch PS on, TS closed and the bracket A in latchable position thereby closing the normally open contacts of 38p, valve Vp closes the atmospheric vent and connects Vv to the manifold, and the valve Vv remains open, thus connecting the bellows to the vacuum manifold. Upon engine starting, the vacuum developed latches plug P as described; and the attendant closing of microswitch 36 energizes the solenoid 42 to close the valve Vv and lock the vacuum in bellows 25. Thus in event of a collision, even though engine operation is interrupted, the latch is kept locked during at least the particularly dangerous several moments thereafter, until the vehicle has had a chance to come to rest.

The warning light WLS alerts the operator to turn on the system should the manual system disabling switch PS happen to be off. With switch PS on, light WLU warns if the bracket A is for some reason not fully retracted into latchable position, under which condition 38p being open prevents a useless bellows actuation.

When the ignition switch is turned off, de-energizing solenoid 42 and not only opening the valve Vv, but also valve Vp, the vacuum in bellows 25 is immediately bled or vented, allowing the bellows to expand and unlatch the plug P.

When it is desirable to have the belt releasable without turning off the engine, the control branch could be used with merely the switch PS (for manual disabling). However, by inclusion of TS, the vehicle may be stopped, and without turning off the engine, upon setting the transmission at "Park," the solenoid 47p de-energizes, opening the vent in valve Vp, to release the belt latching, so that the occupant may leave the seat, or open the door. Upon shifting out of "Park" (or "Neutral") thereby closing TS and Vp, the unit again latches.

Figure 5:
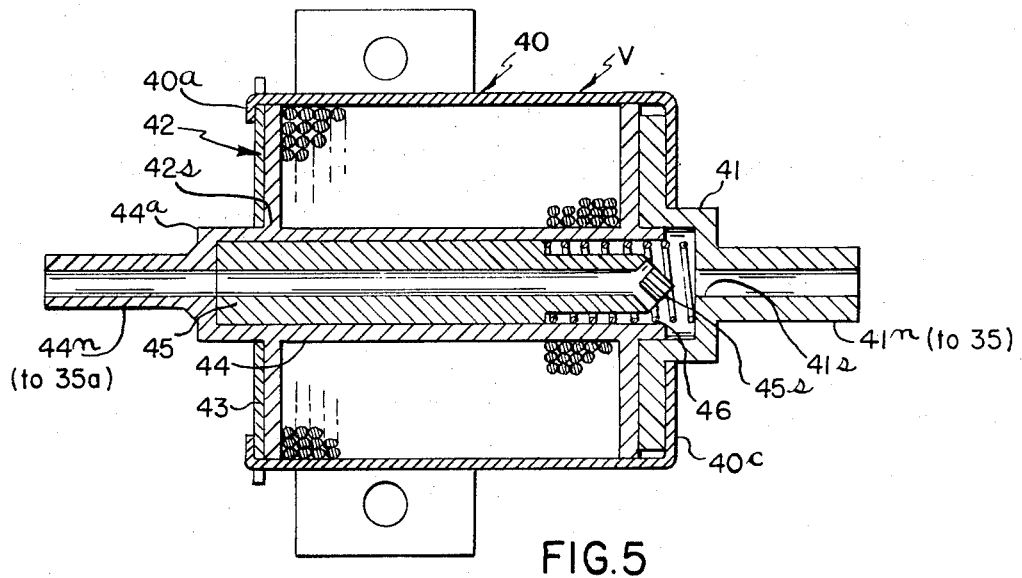
FIG. 5 is a detail of a solenoidal vacuum or air flow valve of the control system.

For the function of Vp also a valve such as V in FIG. 5 may be used connected to line 35 in reversed sense, as an atmospheric vent valve; and with 42 and 36 then connected serially directly to the controlled side of the ignition switch.

The solenoidal air valve V shown in FIG. 5 includes a simple cylindrically cup-shaped drawn sheet metal housing 40 with mounting ears; a solenoid 42 with spool inner end flange holding a disc-like element 41 seated in the cup bottom 40c; and a spool retaining cover 43 secured by bent housing lugs 40a. The large coaxial projection of element 41 extending through a bottom wall central aperture holds the disc centered in the housing; and is externally reduced as a connection nipple 41n for the vacuum line 35. In the non-magnetic solenoid spool 42s, the central tube 44 provides a chamber for the slideable ferromagnetic tubular valve member 45 as an armature. The projecting inner end of 44 is piloted in a central recess of element 41 coaxially aligning the valving member 45 with the bore of nipple 41n, from the inner bore mouth 41s of which 45 is biased open by spring 46. The outer end 44a again is reduced as a nipple 44n for connecting tubing 35a.

With the left end of ferromagnetic member 45 projecting beyond the winding on the spool, and its spring-accommodating reduced right end lying essentially within the winding, obviously solenoid energization will bring the conically pointed right end 45s into valve-closing seated engagement against the mouth edge or seat 41s. The central bore of member 44, in constant communication with the nipple 44n, opens through apertures located to the left of the seat contacting portion of point 45s.

Since vacuum need be maintained in the bellows 25 for only say twenty or thirty seconds after engine rotation stops, and vacuum is maintained at nipple 44n during motor operation, this relatively simple low cost valve structure is quite sufficient for the application. Actually a slightly leaky valve is preferable for $V_v$ which will allow unlatching several seconds after the intake manifold vacuum vanishes.

Since the latching means locks directly on the withdrawable terminating portion of the overall belt arrangement, the above described latching is for that reason presently deemed preferable to alternative methods within the invention such as: (a) mounting bellows 25 (or a latch plate operating solenoid) and the latch plate 26 on the channel top wall 11, with the latch plate directed so that its bifurcated end may engage an upwardly projecting portion of reel shaft top end 18t, with microswitch 36 then correspondingly located on top of wall 11 for actuation when the latch plate is advanced across slot 11s to lock shaft 18, hence the reel, against translation and thereby against belt releasing rotation; or (b) mounting the bellows 25 and a plain ended sliding latch plate 26 within the channel frame behind the retracted reel position, so that the latch plate end may advance to a locking position engaged either between sprocket teeth or in square notches provided in the inter-tooth spaces of the sprocket disc edges, with the latch plate end optionally broadened, thus to engage both sprocket discs for strength, again the microswitch being located so as to be actuated by some part of the latch plate when the latter is shifted into locking position, preventing reel rotation and translation and belt release.

In any of these alternatives if, rather than cable, the reel-wound terminating portion of the belt is itself belting material, either a continuation of or connected to the main belt portion across the seat position, as in a modification hereinafter described, and accordingly the receptor G and perhaps even bracket A are then not used, the microswitch 38 would then be so located as to be actuated by another part of the reel assembly when the latter is in retracted position, for example, one or the other end of shaft 18; and in such case, the ends of the slot masking band 34 may be connected to a light simple block, with a flared mouthed belt slot, taking the place of the plug receptor G.

To give added comfort and convenience, with the above described unit, the inside belt end, that is, the belt end away from the door, may be anchored by a known type of so-called inertial device which permits a slow or gentle unreeling of a belt portion, such as would be involved in permitting unrestrained normal movements of a person in the seat, yet which locks that end upon sudden vehicle deceleration, or sudden movement of the person as would result say with sudden deceleration; but with such anchoring, in order to have proper advancement of the reel, for swinging the belt forward to the preferred extent, either the degree of unreeling of the inside belt end is limited or the force required for its withdrawal is set to be somewhat greater than the force required to be applied to withdraw the wound portion of the belt from, and advance the reel along the rack in, the above described door unit.

For these purposes of allowing the belt to move with the user in normal motions, that is, to allow normal personal movements in the seat essentially unhindered by the belt, all needful expedients may be incorporated in the door unit, without recourse to a special anchor device for the inside belt end, by interposing in mechanical sense, between the non-rotatable translatable reel support shaft 18 and the rotatable reel, an inertial lock mechanism as disclosed for the Karlsson harness safety reel at page 94, Product Engineering, Apr. 24, 1967, whereof the locking cover would be secured to shaft 18 and the spindle-supported components carried by a shaft-surrounding collar rigid with the present reel; such mechanism being locatable either within the reel drum 17 in space free of the springs, or outboard between one end of the reel and an adjacent slotted channel wall 11 or 12. With such inertial locking associated with the reel 17 and no further controls, not only the small extent of belt unwinding and a concommitant mechanism translation is permitted for normal body motion, but also the fuller motions for door opening and belt forward swing, as long as the door is not swung open too quickly; while on the other hand, upon sudden bodily movements of emergency or high deceleration conditions, the sudden belt movement locks up the reel against rotation and translation, hence against belt withdrawal.

Figure 7:
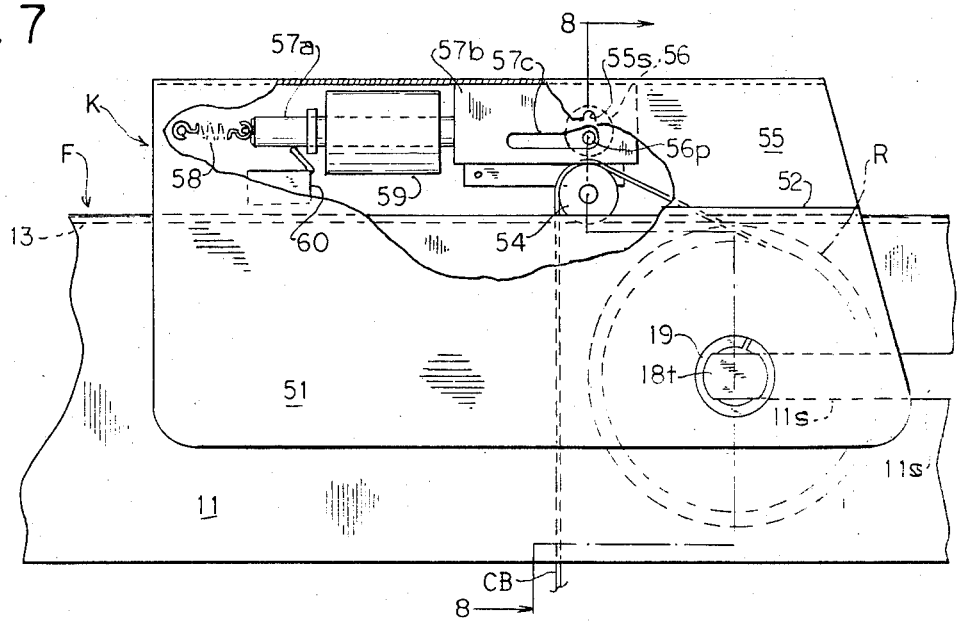
FIG. 7 is a view similar to FIG. 1 but fragmentary, of a modification.
Figure 8:
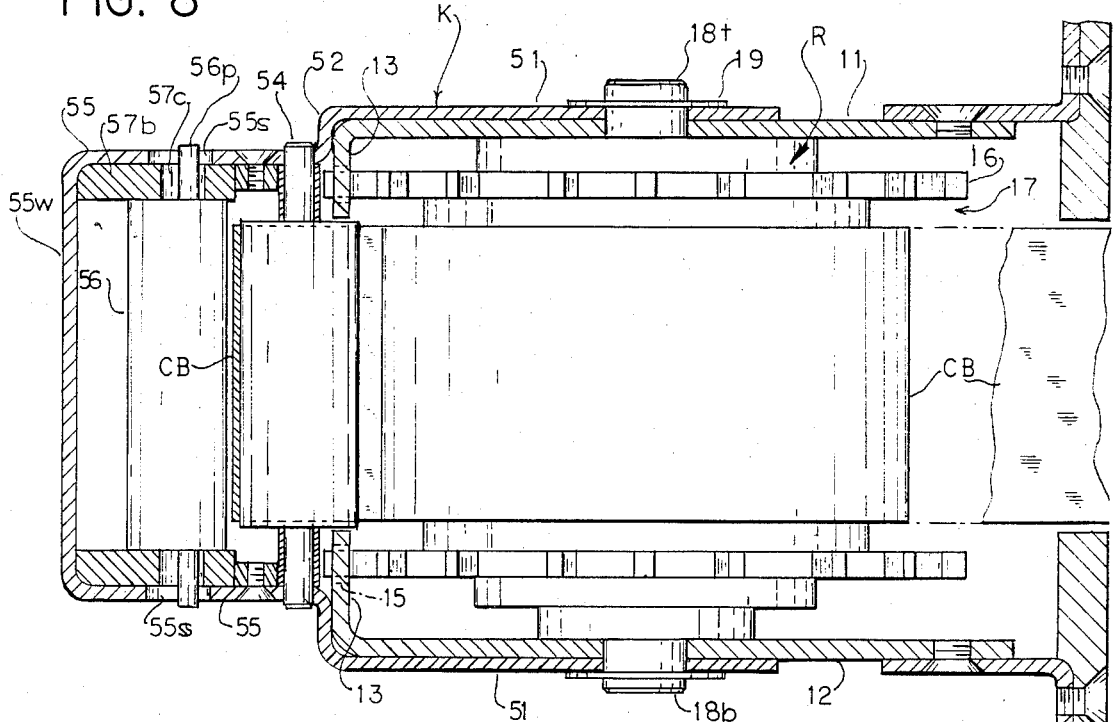
FIG. 8 is a section at 8—8 in FIG. 7.

In FIGS. 7 and 8, the overall organization, including the sprocket reel and rack structure is generally that of FIGS. 1–5, except that the reel 17, rather than cable, has a continuation CB of the main belt material wound thereon as the terminating withdrawable portion of the overall belt arrangement; and a different belt latching device is used which both locks directly on the withdrawable belt portion and yet permits accommodation to normal bodily movements of the user, as well as free door opening.

Here the opposed leg or side plates of a carriage or bracket K, roughly channel shaped or U-shaped in section, are stepped to form outwardly offset portions 51 and inward shoulders 52, slideably embracing the top and bottom frame walls 11, 12 and the margins of the frame vertical wall or web 13 outward of the sprocket rack apertures; the carriage being carried on an assembly with reel 17 by the ends 18t, 18b of the non-rotating shaft 18 projecting through the respective outer plate portions 51. The vertical wall 13 is slotted longitudinally to accommodate the belt portion CB passing from the reel over a roller 54 rotatably mounted in a fixed location relative to and between the inner, more closely spaced, carriage side plate portions 55, the roller 54 serving as a guide for the belt portion extending out of the unit as well as a part of the latching system. An eccentric shiftable knurled roller 56, with the ends of its eccentric shaft or eccentric pivots 56p engaged in like straight slots 55s aimed at the shaft of 54, is shiftable toward the latter for belt gripping contact by a camming yoke of an inertia member 57. The latter comprises an iron rod or tang 57a as an effective inertial body or mass and is also disposed as an armature rearwardly biased by spring 58, but slideable within a solenoid 59; and, rigidly connected to the tang, the parallel yoke side plates 57b. The latter slideably guided between the carriage portions 55–55w–55 embrace endwise the roller 56, with the eccentric pivots or shaft ends of the latter passing through respective camming slots 57c.

These slots extend generally longitudinally of member 57, which in turn is slideable parallel to the rack and thus with a primary direction component in the direction of vehicle motion; and from a forward end enlargement, the outer edge of each slot, i.e., the edge remote from fixed roller 54, tapers inwardly, so that with the inertial body element retracted by spring 58, the shafting of roller 56 being in the slot enlargements, the roller 56 is not constrained into locking engagement with the belt against the cooperating opposed fixed roller. However, upon forward movement of element 57, the roller 56 is cammed inwardly to engage the belt, and any belt withdrawing tendency rotates the eccentric roller into firmer belt gripping relation.

Also mounted in the carriage K adjacent solenoid 59, there is a microswitch 60 with actuating arm displaceable by movement of 57 into latching position; the switch 60 and solenoid 59 being so connected, with the ignition circuit as a power source through flexible leads, that upon belt locking shift of 57, the solenoid is energized to hold 57 locking until the ignition is shut off or the circuit otherwise de-energized to release the belt.

The solenoid 59 may also be used to advance 57 into locking position by connecting it to power through an acceleration sensing device which may be sensitive to sudden sideways motion as well as to the negative acceleration in a fore and aft direction. Where it is desired to use a vacuum bellows to advance or hold the inertia element 57 in locking position, electrically operated vacuum line valving may be controlled similarly by such a sensing device.

With a carriage supported by the reel shaft within the frame channel behind the reel, a spring-retracted, solenoid-held inertia element, with its associated spring, solenoid and microswitch, may be mounted to engage in sprocket inter-tooth notches or spaces upon impact or sudden deceleration thereby to prevent reel rotation, and consequently belt withdrawal and also reel walking until the holding solenoid is de-energized.

What is claimed is:

1. For mounting on a forwardly swinging automotive vehicle door adjacent one side of a seat position provided with a seat belt having a first end secured on the other side of the seat position,
   a unit for securing the second belt end to the door releasably anchored when the door is closed and extensibly with swinging of the belt forwardly away from the seat when the door is opened, said unit comprising:
   a frame securable to the door structure;
   a sprocket rack extending longitudinally of the frame;
   a walking reel assembly including
   a sprocket reel with sprocket teeth engaged in said rack; spring means biasing said reel assembly along said rack toward a retracted rearmost position adjacent said seat;
   means guiding said assembly for translation longitudinally of the frame from said retracted position toward the hinged door edge and back;
   belt terminating flexible means end-anchored and wound on said reel;
   said frame including at its seatward side a longitudinal slot along the path of said assembly to accommodate said terminating means upon reel translation;
   said terminating means wound on said reel in a direction tending to cause the reel to advance forwardly on said rack when the terminating means is withdrawn from the unit as upon door opening, and to rewind the terminating means drawing the belt toward the door upon spring biased reel retraction during door closing.

2. A unit as described in claim 1 with said means guiding said assembly comprising
   longitudinally parallel-slotted, spaced top and bottom walls in said frame, with the slots parallel to said rack, and
   a non-rotatable shaft rotatably supporting said reel and having top and bottom ends slideable respectively in the top and bottom wall slots.

3. A unit as described in claim 2, with said spring means comprising a spiral spring operatively connected between said shaft and said reel to rotationally bias the reel.

4. A unit as described in claim 3, with said reel being hollow as a barrel for said spiral spring.

5. A unit as described in claim 3, wherein:
   said reel is an inertial reel permitting moderate speed belt withdrawal for normal personal body movements of the user and for door opening, and locking to said shaft upon rapid reel rotation upon a fast withdrawal of said terminating means, to secure the belt against forceful body movement.

6. A unit as described in claim 3, including inertial means carried by said reel assembly for translation therewith and adapted to latch the unit against withdrawal of said terminating belt means upon sudden change in vehicle velocity.

7. A unit as described in claim 3, including means for latching the unit against withdrawal of said terminating belt means, whereby said belt is located in operative disposition across said seat position; the latching means actuated into latching condition upon sudden change in vehicle velocity.

8. A unit as described in claim 7, with the latching means controlled by an acceleration sensing device.

9. A unit as described in claim 7, wherein: the latching means comprises:
   a spring retracted inertial body slideably mounted to advance inertially upon vehicle deceleration into engagement in inter-tooth spaces of a sprocket portion of said reel, thereby to block reel rotation and thereby belt withdrawal and reel translation.

10. A unit as described in claim 7, with said latching means further comprising:
    a switch actuated by said inertial body upon advancement to reel blocking position and holding means energized upon actuation of said switch to hold the inertial body in said blocking position.

11. A unit as described in claim 1, including means responsive to a condition initiated with vehicle engine starting to lock said reel assembly at a retracted position, whereby said belt is located in operative disposition across said seat position.

12. A unit as described in claim 1, including latching means blocking said reel assembly from translation and thereby against rotation to lock said flexible means from withdrawal from the unit, whereby said belt is located in operative disposition across said seat position.

13. A unit as described in claim 1, including latching means engaging said belt terminating flexible means to prevent withdrawal from the unit, whereby said belt is located in operative disposition across said seat position.

14. A unit as described in claim 12, including as said belt terminating flexible means, a length of belt material end-anchored on and wound on said reel; and as said latching means, a carriage secured to and guided for translation with said reel assembly, a fixed roller rotatably mounted on the carriage with said length passing thereover from the reel to leave said unit, a shiftable roller mounted by eccentric shaft means displaceable on the carriage toward and away from the fixed roller, said shiftable roller cooperable with the fixed roller to engage and immobilize said length thereby to latch the unit against belt withdrawal, and camming means engaging said shaft means to shift the shiftable roller toward belt gripping engagement.

15. A unit as described in claim 14, including a return spring biased inertial body connected with and actuating said camming means for said belt gripping engagement by inertial body advancement upon deceleration of the vehicle, and means for holding the said body advanced.

16. A unit as described in claim 1, wherein:
said belt terminating means comprises a flexible cable on said reel;
said unit further comprising a bracket carried by said reel assembly for translation therewith longitudinally on said frame and including an apertured cable guide accommodated in said longitudinal slot of the frame and having said cable passed therethrough;
a belt anchoring plug secured on the cable, receivable in the aperture of said guide, and having connected thereto the doorward end of the main belt portion spanning said seat position;
and latch means to lock said plug in the guide aperture and thereby to lock said guide and reel assembly at a retracted position with the belt anchored in operative disposition across said seat position.

17. A unit as described in claim 16, wherein: said latch means includes a latch plate on said frame engageable with said plug and spring biased out of latching position.

18. A unit as described in claim 17, wherein: said latch means includes, as a latch actuator, a vacuum bellows sliding said latch plate to plug-engaging position upon vacuum effected contraction and embodying a bellows-expanding spring providing a plate return bias.

19. A unit as described in claim 18, wherein:
said plug is circumferentially grooved and said latch plate bifurcated to engage in the grooved portion of the plug.

20. A unit as described in claim 19, wherein:
said bellows is connected to the vehicle engine intake manifold to cause latch actuation upon engine starting.

21. A unit as described in claim 20, including
a normally open, solenoidally closed valve in a vacuum line between said bellows and said manifod;
a switch closed by said latch plate advanced to plug engaging position and opened upon latch plate retraction;
said switch and the solenoid of said valve in a series electrical control branch between the controlled side of the engine ignition switch and ground of the vehicle;
whereby the valve locks the vacuum in said bellows upon engine starting and plug latching.

22. A unit as described in claim 21, including second solenoidally controlled valve means connected to said vacuum line,
adapted in one condition to vent said line and bellows and thereby unlatch said plug and in a second condition non-venting to permit vacuum application to the bellows,
a transmission switch closed when the vehicle is in a driveable transmission setting and opened when the transmission is set for non-driving;
the solenoid of said second valve and said transmission switch connected between ground and a point energized from the controlled side of the ignition switch.

23. A unit as described in claim 22, wherein:
said transmission switch is included in said control branch.

24. A unit as described in claim 22, including as said second valve a three-way valve in said line between the first said valve and the intake manifold as a vacuum source, said three-way valve being in said one condition upon solenoid de-energization and connecting the vacuum input side of the first valve to atmosphere and in said second condition upon solenoid energization connecting said input side of the first valve to said manifold.

25. A unit as described in claim 1, including a flexible band with opposite ends secured to a shiftable apertured element to assume a closed configuration running about said unit over guide rollers maintaining the band in a longitudinal disposition parallel to and over said longitudinal slot of the said frame with the said element shiftable parallel to the slot with said belt terminating means extending through the aperture thereof thereby to provide a mask for said slot and for a corresponding slot-like opening of a cover for the frame.

26. A unit as described in claim 1, including
controlled latch means for latching the unit against withdrawal of said terminating belt portion, whereby said belt is located in operative disposition across said seat position; and
control means for said latching means comprising first means controlling operation of the latch means to latched condition when the vehicle engine is started and thereafter maintaining the latched condition during engine operation, and second means manually settable to remove control from said first means, whereby the unit may be rendered inoperable by the user.

27. A unit as described in claim 26, with said latch means comprising vacuum actuated means connected to the engine intake manifold.

28. For mounting on a forwardly swinging automotive vehicle door adjacent one side of a seat position provided with an occupant-restraining seat belt having a first end secured on the other side of the seat position,
in combination with anchoring means for the said first end, automatic means for securing the second belt end to the door releasably anchored proximate to the seat position when the door is closed and shiftably with swinging of the belt forwardly away from the seat when the door is opened, and
means including a reel for a terminating portion for one said belt end allowing the terminating portion to be withdrawn from the reel as upon door opening and to rewind the terminating portion drawing the belt toward the seat occupant upon spring biased retraction during door closing and securing the belt relative to the occupant in safetying disposition for occupant restraint upon a damgerous change in vehicle velocity, the last said means allowing freedom for normal bodily movement of the occupant; said automatic means being a unit comprising:

a frame secured to the door structure, cooperating means including a sprocket rack, extending longitudinally of the frame, having engaged therein, a sprocket with said second belt end secured thereto, and spring means biasing said sprocket along said rack toward a retracted rearmost position adjacent said seat, said cooperating means affording guided translation longitudinally of the frame for said second belt end from said retracted position toward the hinged door edge and back, said frame including at its seatward side a longitudinal slot along the path of said sprocket to accommodate said second belt end upon said translation.

* * * * *